(12) United States Patent
Swanson et al.

(10) Patent No.: US 8,947,648 B2
(45) Date of Patent: Feb. 3, 2015

(54) SYSTEMS AND METHODS FOR SIGNAL PROCESSING IN OPTICAL IMAGING SYSTEMS

(75) Inventors: Eric A. Swanson, Gloucester, MA (US); Eman Namati, Arlington, MA (US); Michael Madden, Princeton, MA (US); J. Christopher Flaherty, Auburndale, FL (US)

(73) Assignee: Ninepoint Medical, Inc., Cambridge, MA (US)

( * ) Notice: Subject to any disclaimer, the term of this patent is extended or adjusted under 35 U.S.C. 154(b) by 228 days.

(21) Appl. No.: 13/412,787

(22) Filed: Mar. 6, 2012

(65) Prior Publication Data

US 2012/0224165 A1    Sep. 6, 2012

Related U.S. Application Data

(60) Provisional application No. 61/449,700, filed on Mar. 6, 2011.

(51) Int. Cl.
*G01B 11/26* (2006.01)
*G01B 9/02* (2006.01)

(52) U.S. Cl.
CPC ........ *G01B 9/02091* (2013.01); *G01B 9/02004* (2013.01); *G01B 9/02045* (2013.01); *G01B 9/02079* (2013.01); *G01B 2290/70* (2013.01)
USPC ........................................... 356/28.5; 356/28

(58) Field of Classification Search
USPC ............ 356/3.01–3.15, 4.01–4.1, 5.01–5.15, 356/6–22, 28, 28.5
See application file for complete search history.

(56) References Cited

U.S. PATENT DOCUMENTS

| | | |
|---|---|---|
| 7,995,627 B2 | 8/2011 | Bouma et al. |
| 2006/0192969 A1* | 8/2006 | Marks et al. .................. 356/451 |
| 2010/0118292 A1* | 5/2010 | Park et al. .................... 356/5.01 |

* cited by examiner

*Primary Examiner* — Luke Ratcliffe
(74) *Attorney, Agent, or Firm* — Sorell, Lenna & Schmidt, LLP

(57) ABSTRACT

Systems, devices and methods of producing an image are provided. A electro-magnetic radiation source provides electro-magnetic radiation to a sample and a reference. A detector/interferogram unit produces at least one interferogram that is supplied to a signal processing unit. The signal processing unit extracts phase, magnitude, and/or polarization data from the supplied signals, and produces an image based on at least the extracted data.

35 Claims, 6 Drawing Sheets

SYSTEMS AND METHODS FOR SIGNAL PROCESSING IN OPTICAL IMAGING SYSTEMS

PRIORITY

This application claims the benefit of U.S. Provisional Application No. 61/449,700, filed Mar. 6, 2011, the entire contents of which is incorporated herein by reference.

DESCRIPTION OF THE INVENTION

This invention relates generally to the field of optical imaging in biomedical and other medical and non-medical applications where interferometric optical ranging and imaging using an optical source that is frequency tuned are utilized.

BACKGROUND OF THE INVENTION

Numerous designs and implementation of swept source optical coherence tomography (OCT) and other interferometric optical imaging and ranging systems exist today. The receiver systems used today consist mostly of a single or dual-balanced signal detector to detect a signal that is then digitized and processed to produce ranging and imaging information. Multichannel systems can perform polarization sensitive (PS) OCT or phase measurements or functional imaging on Doppler imaging signals. However, both the single channel systems and the multichannel systems suffer from receiver designs that are overly complex, unreliable, non-manufacturable, or expensive. A simple, compact, manufacturable receiver architecture to allow for the many configurations designed for swept source OCT (SS-OCT) systems is needed. This disclosure describes an improvement over these prior art technologies.

SUMMARY

Accordingly, an imaging system is provided that includes an electro-magnetic radiation source configured to provide a first electro-magnetic radiation to a sample and a second electro-magnetic radiation to a reference, wherein a frequency of radiation provided by the electro-magnetic radiation source varies over time; a detector/interferogram unit configured to detect an interference between a third radiation associated with the first radiation and a fourth radiation associated with the second radiation and generate at least one interferogram associated with the third electro-magnetic radiation and the fourth electro-magnetic radiation; and a signal processing unit configured to extract hybrid data from the at least one interferogram and produce an image of the sample based on the hybrid data, wherein the hybrid data includes at least one of magnitude data, phase data, and polarization data.

In one embodiment, a method for processing data in an imaging system includes providing by an electro-magnetic radiation source a first electro-magnetic radiation to a sample and a second electro-magnetic radiation to a reference; varying a frequency of radiation provided by the electro-magnetic radiation source varies over time; detecting by a detector/interferogram unit an interference between a third radiation associated with the first radiation and a fourth radiation associated with the second radiation; generating by the detector/interferogram unit at least one interferogram associated with the third electro-magnetic radiation and the fourth electro-magnetic radiation; extracting by a signal processing unit hybrid data from the at least one interferogram; and producing by the signal processing unit an image of the sample based on the hybrid data, wherein the hybrid data includes at least one of magnitude data, phase data, and polarization data.

In one embodiment, an imaging system includes a transmitter configured to provide a first electro-magnetic radiation to a sample and a second electro-magnetic radiation to a reference, wherein a frequency of radiation varies over time; a receiver configured to detect an interference between a third radiation associated with the first radiation and a fourth radiation associated with the second radiation and generate at least one interferogram associated with the third electro-magnetic radiation and the fourth electro-magnetic radiation; and a processor configured to extract hybrid data from the at least one interferogram and produce an image of the sample based on the hybrid data, wherein the hybrid data includes at least one of magnitude data, phase data, and polarization data.

BRIEF DESCRIPTION OF THE DRAWINGS

The present disclosure will become more readily apparent from the specific description accompanied by the following drawings, in which.

Like reference numerals indicate similar parts throughout the figures.

DETAILED DESCRIPTION OF THE PREFERRED EMBODIMENTS

Figure 1:
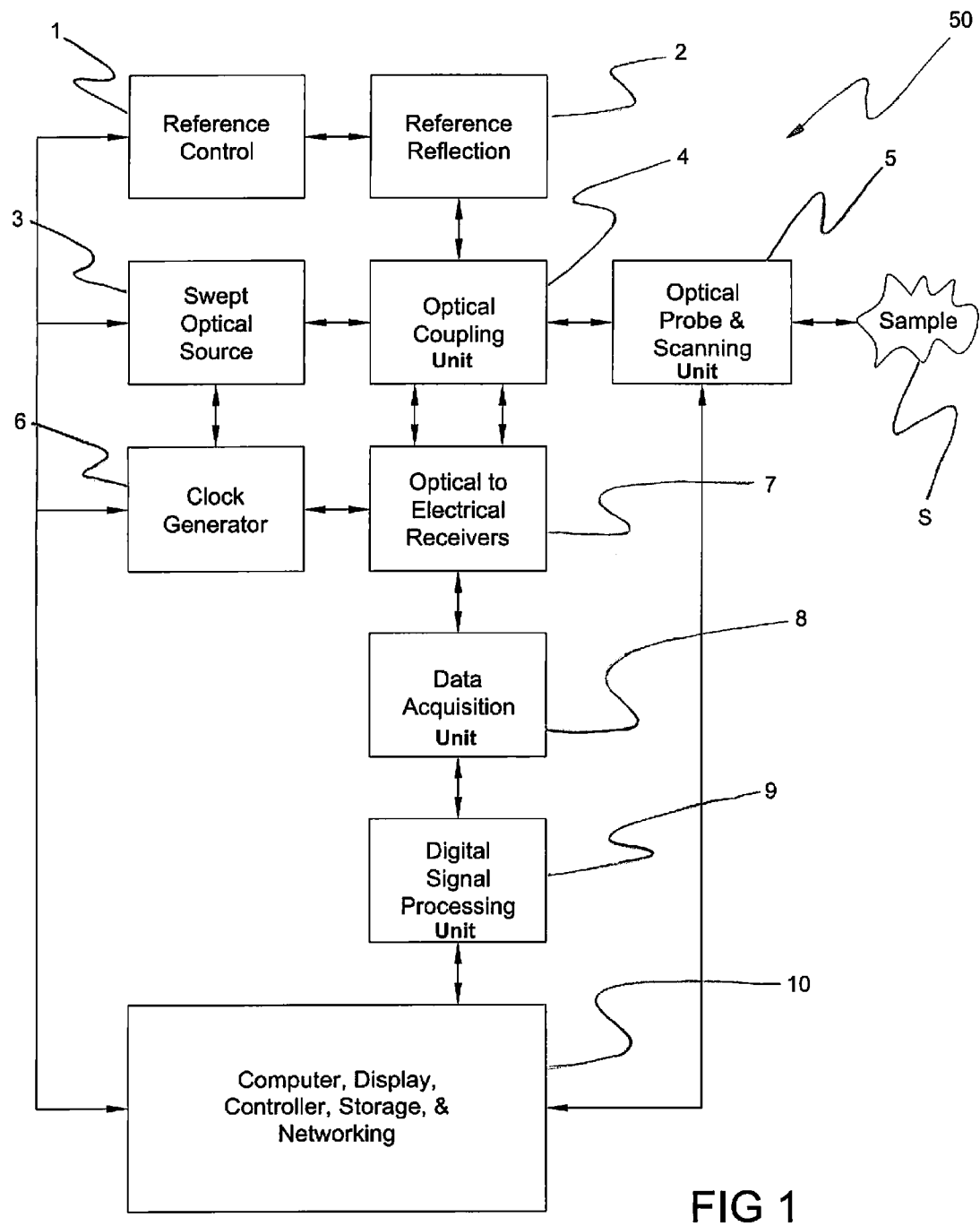
FIG. 1 is a block diagram of a swept source optical coherence tomography system in accordance with the principles of the present disclosure.

Reference will now be made in detail to the present embodiments of the invention, examples of which are illustrated in the accompanying drawings. Wherever possible, the same reference numbers will be used throughout the drawings to refer to the same or like parts.

The present disclosure may be understood more readily by reference to the following detailed description of the disclosure taken in connection with the accompanying drawing figures, which form a part of this disclosure. It is to be understood that this disclosure is not limited to the specific devices, methods, conditions or parameters described and/or shown herein, and that the terminology used herein is for the purpose of describing particular embodiments by way of example only and is not intended to be limiting of the claimed disclosure. Also, as used in the specification and including the appended claims, the singular forms "a," "an," and "the" include the plural, and reference to a particular numerical value includes at least that particular value, unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment. It is also understood that all spatial references, such as, for example, horizontal, vertical, top, upper, lower, bottom, left and right, are for illustrative purposes only and can be varied within the scope of the disclosure. For example, the references "superior" and "inferior" are relative and used only in the context to the other, and are not necessarily "upper" and "lower".

For the purposes of promoting an understanding of the principles of the present disclosure, reference will now be made to the embodiments illustrated in the drawings, and specific language will be used to describe the same. It will nevertheless be understood that no limitation of the scope of the disclosure is intended. Any alterations and further modifications in the described devices, instruments, methods, and any further application of the principles of the disclosure as described herein are contemplated as would normally occur to one skilled in the art to which the disclosure relates. In particular, it is fully contemplated that the features, components, and/or steps described with respect to one embodiment may be combined with the features, components, and/or steps described with respect to other embodiments of the present disclosure. The following discussion includes a description of an imaging system in accordance with the principles of the present disclosure. Alternate embodiments are also disclosed. Reference will now be made in detail to the exemplary embodiments of the present disclosure, which are illustrated in the accompanying figures.

FIG. 1 is a block diagram of a swept source optical coherence tomography (SS-OCT) system in accordance with the principles of the present disclosure. System 50 includes a frequency tunable optical source 3. There are many types of tunable optical sources, some of which require external optical clock signals, from, for example, a clock generator 6, to calibrate for non-linear sweeps; other tunable optical sources are contemplated. The output of clock generator 6 can be used to drive an analog-to-digital (A/D) converter in an optical to electrical receiver 7 or the A/D conversion can be processed in a data acquisition unit 8. Alternatively, a signal undergoing A/D conversion can be electrically resampled using interpolation algorithms in a digital signal processing unit 9. In operation, the light from source 3 is split between clock generator 6 and optical coupling unit 4, with optical coupling unit 4 receiving the larger percentage of the split light. Approximate ranges can include 1-5% of the light supplied to clock generator 6 and 95-99% of the light supplied to optical coupling unit 4. Optical coupling unit 4 directs light to and from a reference reflection 2 and an optical probe and scanning unit 5. Scanning unit 5 scans the light onto sample S in either one or more dimensions. Light reflected from the sample S and reference reflection 2 is directed through optical coupling unit 4 where an interference of the light reflected from the sample S and reference reflection 2 occurs and is detected by optical to electrical receivers 7 and forwarded to a data acquisition unit 8. The output of data acquisition unit 8 is sent to a digital signal processing unit 9.

System 50 is controlled by unit 10 which can include a processor, a display, a memory, and a networking unit. Unit 10 is in communication with and controls reference control unit 1 (e.g. to adjust the reference reflection), source 3, clock generator 6, and scanning unit 5. System 50 may include optional manual or computer controlled polarization controllers, not shown, through the optical system, as is known in the art. Additionally Faraday isolators, Faraday circulators, and other items as is known in the art, not shown, may also be used.

Figure 2:
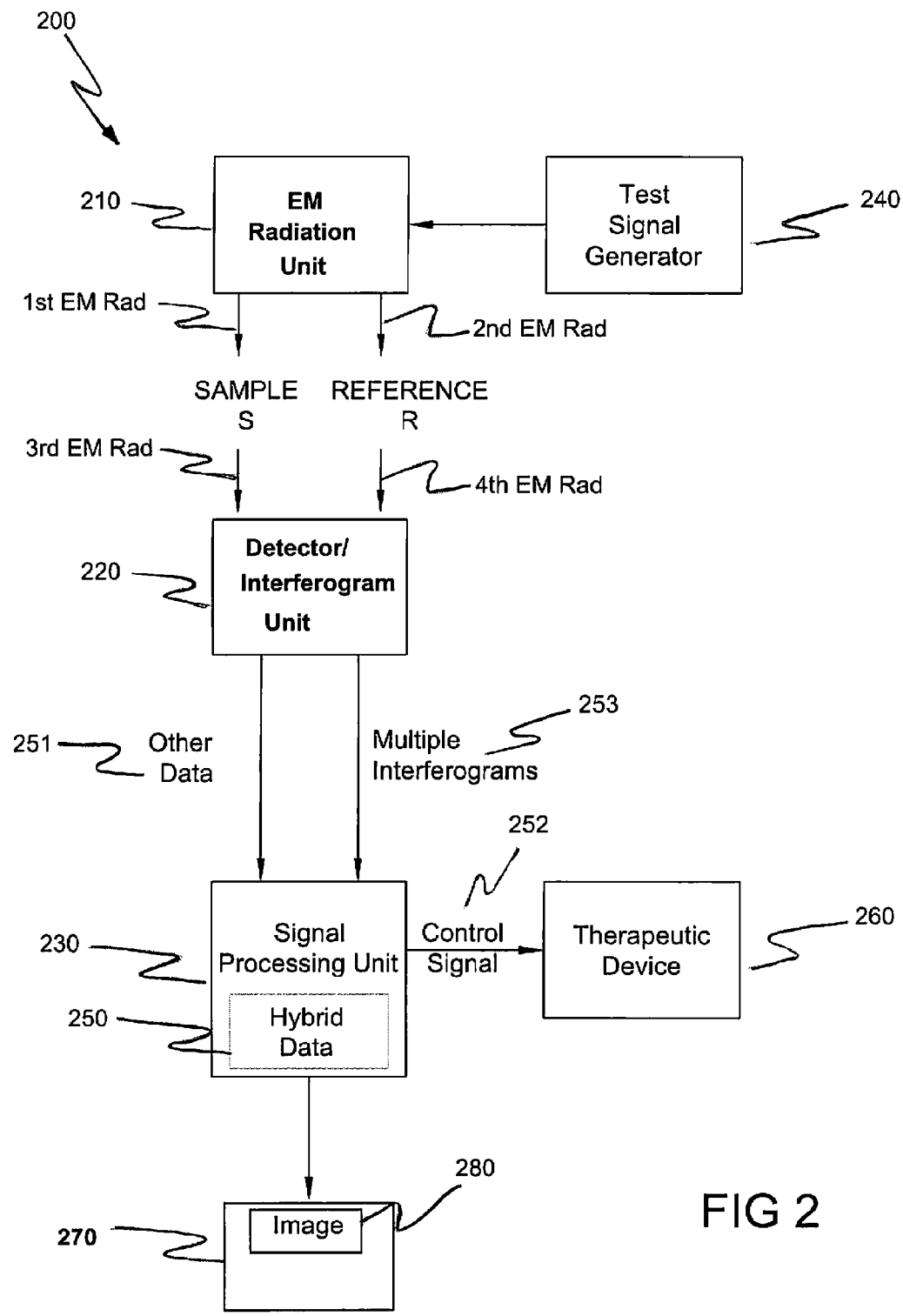
FIG. 2 is a block diagram of an imaging system in accordance with the principles of the present disclosure.

FIG. 2 is a block diagram of an imaging system in accordance with the principles of the present disclosure. System 200 comprises an electro-magnetic (EM) radiation unit 210 configured to provide a first electro-magnetic radiation to a sample S and a second electro-magnetic radiation to a reference R. The frequency of the first and second radiations can be varied over time. Additionally, system 200 comprises a detector/interferogram unit 220 configured to detect interference between a third radiation and a fourth radiation, which are reflections of the first radiation and the second radiation, respectively. Detector/interferogram unit 220 is further configured to provide multiple interferograms 253 (e.g. in-phase and quadrature interferograms based on mixing of the third and fourth radiation) to a signal processing unit 230; other data 251 may also be provided to signal processing unit 230 by detector/interferogram unit 220.

Signal processing unit 230 is configured to extract hybrid data 250 from the multiple interferograms 253 and the other data 251 provided by detector/interferogram unit 220. Hybrid data 250 can include data representing the third radiation and the fourth radiation and can include magnitude data, phase data, polarization data, and combinations thereof. Using at least the hybrid data 250, potentially in combination with other data 251, signal processing unit 230 is configured to generate an image 280 of at least a portion of the sample on display 270. In a typical embodiment, system 200 may comprise an SS-OCT system that can include a polarization diverse, dual balanced coherent quadrature receiver. Dual polarization of the receiver allows the polarization state information of hybrid data 250 to be determined. The multiple interferogram signals received by signal processing unit 230 can be combined into a complex interferogram from which the phase and magnitude portions of hybrid data 250 can be extracted.

Electro-magnetic radiation unit 210 may include a laser configured to provide the first electro-magnetic radiation to the sample S and the second electro-magnetic radiation to the reference R. The frequency of the first and second radiations can be varied over time. Electro-magnetic radiation unit 210 can include a single laser to produce a coherent light source that is split to produce the first and second electro-magnetic radiations. The laser can be a swept frequency or otherwise variable frequency laser. Additionally, electro-magnetic radiation source 210 may comprise an interferometer, such as an interferometer configured to split a single wave into two waves, allowing the two waves to propagate through independent paths, and then recombine them to generate interference signals.

Detector/interferogram unit 220 may comprise two polarization splitters and a hybrid, typically two 90-degree optical hybrids, configured to detect the interference between the third radiation and the fourth radiation. The two polarization splitters enable separation and measurement of a polarization state of the received radiation. The optical hybrid provides in-phase and quadrature interferogram signals that can be combined, analyzed or otherwise processed to create and/or improve the image of the sample by signal processing unit 230. The optical hybrid can include a bulk optic hybrid, a fiber optic hybrid, an integrated optic hybrid, or combinations thereof. The hybrid can include a 4 or 6-port device that can perform mixing of two input signals and outputs, either two or four signals, one or two being phase shifted with respect to the other one or two. Such a configuration allows for proper detection (e.g. dual balanced detection in a 6-port device)

with decomposition of the mixed signal into their real and imaginary components. This configuration allows for the extraction of both magnitude and phase of the input signal by signal processing unit 230. Detector/interferogram unit 220 is configured to provide multiple interferograms 253 and other data 251 to signal processing unit 230. The two polarization splitters and two 90-degree optical hybrids can be provided in a single package. In one embodiment, the two polarization splitters and the two 90-degree optical hybrids can provide a pair of optical paths having matching path lengths. Additionally, detector/interferogram unit 220 can further include photo detectors, which may also be provided in the single package. In one embodiment, a 4-port hybrid is in communication with 2 photo detectors. In another embodiment, a 6-port hybrid is in communication with 2 dual balanced photo detectors (i.e. 4 photo detectors). The optical hybrid can include a 3×3 coupler or a 4×4 coupler.

Signal processing unit 230 can include a digital signal processor configured to generate image 280. Typically the digital signal processer is configured to perform various signal processing functions including but not limited to combining the multiple interferograms 253 received from detector/interferogram unit 220 into a complex interferogram. Phase and magnitude data can be extracted from the complex interferogram. Image 280, generated by signal processing unit 230, can include a one-dimensional, two dimensional and/or three-dimensional image of at least a portion of a sample. Non-limiting examples of the sample can include soft or hard tissue, organ tissue, esophageal tissue such as esophageal wall tissue, stomach tissue, and combinations thereof. In addition to visual information, image 280 can include other information, such as non-visual information relative to or otherwise associated with the sample. For example, image 280 can include movement information of the sample, where movement values may be represented by variations in one or more of color, shade, hue, pixel density, brightness, and contrast provided on image 280. The movement information can include information about the movement of a liquid such as blood, bile, stomach fluids, agents such as drugs, saline, and combinations thereof. The movement information may be extracted from one or a combination of the hybrid data 250 determined in the signal processing unit 230.

Signal processing unit 230 can be configured to improve the quality of image 280 based on hybrid data 250. Based on an analysis of the hybrid data 250, one or more variables (e.g. mathematical coefficients) or other parameters may be adjusted (e.g. increased or decreased). One or more variables can have a standard value, such as a value used based on normal or expected conditions. These variable values may need to be adjusted, such as an adjustment over time, or an adjustment based on one or more system options or modifications such as the swept source laser. The variables can be stored in the memory. The signal processing unit 230 can improve the quality of image 280 by reducing artifacts that may be produced in image 280, by compensating for system 200 imperfections, by compensating for detector/interferogram unit 220 imperfections, and/or by increasing system 200 sensitivity, as will be described herein below. Signal processing unit 230 may further generate image quality data which may represent an assessment of the quality of at least a portion of image 280 or all of image 280. The quality data may be qualitative or quantitative data and may provide an assessment of one or more of resolution of image 280, likelihood of distortion, and likelihood of presence of an artifact. In one embodiment, the quality data may be based on hybrid data associated with at least a portion of image 280. Alternatively or additionally, signal processing unit 230 can be configured to compare hybrid data 250 or processed hybrid data to one or more thresholds where the image quality is based on the comparison. Processed hybrid data can include hybrid data that has been averaged, combined, integrated, extrapolated, mathematically processed, filtered, amplified, and combinations thereof. In one embodiment, image 280 comprising pixels, and the quality data can be assessed according to each pixel. In another embodiment, image 280 can include pixels arranged into multiple groups such that the quality data includes data associated with each pixel group. In another embodiment, the quality data can be represented as an overlay layer of image 280. For example, a color scale, similar to a heat map, representing poor to superior quality may overlay image 280 at the option of the user.

Signal processing unit 230 can provide control signal 252 to therapeutic device 260 thus instructing device 260 on how to proceed based upon a comparison of hybrid data or processed hybrid data to a threshold. For example, if the hybrid data or processed hybrid data exceeds a threshold value (e.g. is below a minimum value or above a maximum value), the function of therapeutic device 260 may be modified or powered down. Modifications to the device may include a modification to the amount of power delivered and/or the drug or agent being delivered to the sample.

System 200 can include one or more therapeutic or diagnostic devices 260. Therapeutic device 260 can include an energy delivery device such as a laser. In one embodiment, the laser may be used to remove or denature tissue. In addition to its utility as a therapeutic tool, the laser may assist in the delivery of a therapy, for example, to mark or otherwise differentiate tissue. The signal processing unit 230, as described above, can be particularly useful in this application to modify or power down the energy delivered to the tissue. Alternatively, device 260 can include a heating element comprising at least one radio-frequency (RF) energy delivery electrode. In another embodiment, device 260 can include a drug delivery device. In yet another embodiment, device 260 can include a cryogenic element.

System 200 can include a test signal generator 240 configured to provide electro-magnetic radiation to electro-magnetic radiation source 210. Data produced when test signal generator 240 generates electro-magnetic radiation may be used by system 200, such as in signal processing unit 230. The test signal data can be stored in the memory for use at a time subsequent to test signal generator 240 delivering the electro-magnetic radiation, such as during clinical use of system 200, and/or during a calibration procedure performed by a calibration subroutine of system 200 (described in detail herein below). The test signal is a signal with known properties and can be utilized to ensure system 200 is operating within desired parameters. The test signal generator can include its own electro-magnetic source (e.g. a laser). Alternatively, the test signal generator radiation may be provided by the same source providing the first or second electro-magnetic radiations (e.g. a swept laser source). At least a portion of the test signal data can be included in the data used by signal processing unit 230 to generate image 280.

System 200 can include display 270, typically one or more visual monitors configured to display image 280 based on one or more signals generated by signal processing unit 230.

System 200 can include a rotating optical system, such as the systems described in U.S. Pat. No. 7,995,627, entitled "Process and Apparatus for a Wavelength Tuning Source" to Bouma, et al., which is incorporated herein by reference in its entirety. The optical arrangement can include a single optical fiber or a bundle of optical fibers, such as an optical fiber that is rotated and linearly translated to create a 3D image of the area proximate the distal end of the optical fiber. The optical fiber or other component of an optical arrangement (e.g. a lens or mirror) can have its real-time rotational velocity detected by signal processing unit 230 based on hybrid data 250, such as from the derivative of the phase data. With this information of actual rotational velocity, signal processing unit 230 can compensate for undesired rotational speed variations of one or more components of the rotating optical arrangement.

Figure 3:
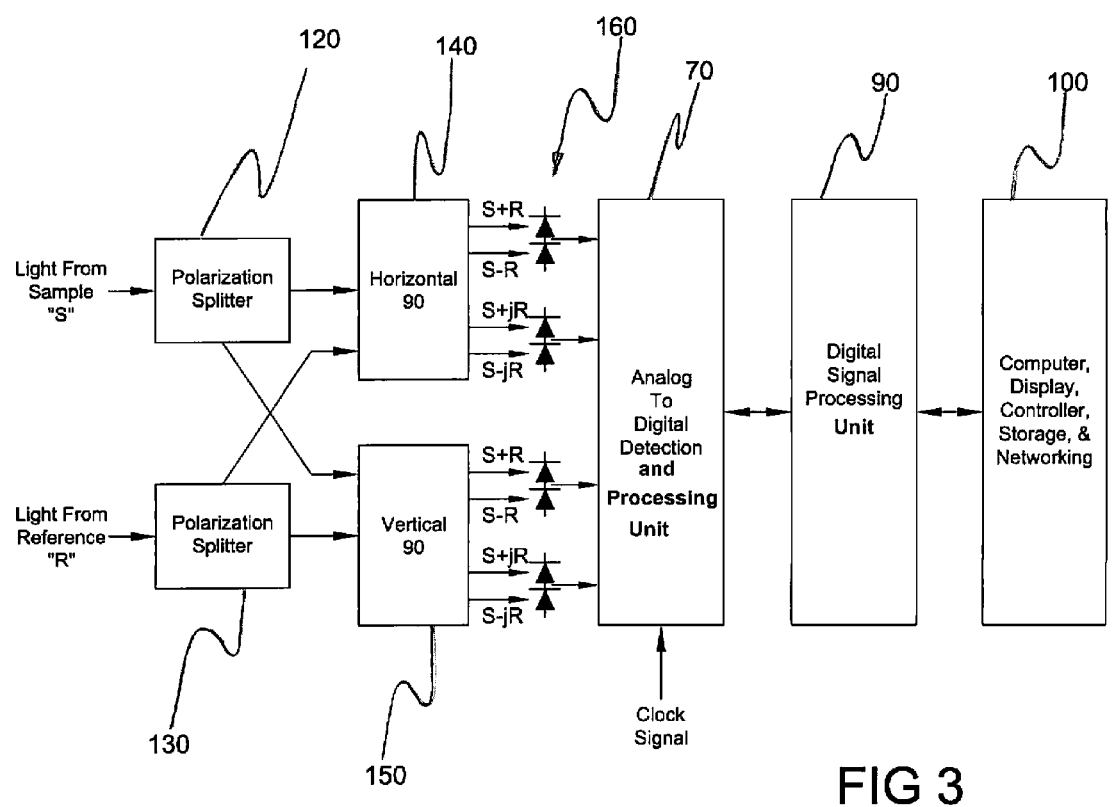
FIG. 3 is a block diagram of a receiver comprising an optical hybrid in accordance with the principles of the present disclosure.

FIG. 3 is a block diagram of a dual-polarization, dual balanced, optical, 90-degree hybrid coherent receiver in accordance with the principles of the present disclosure. The system of FIG. 3 is described for use in a swept source OCT system, but other elector-magnetic radiation systems are contemplated.

Imaging systems such as a swept source OCT system exhibit particular characteristics that require targeted solutions. For example, imperfections in the horizontal and vertical polarization splitter and more importantly imperfections in the optical 90-degree hybrids produce errors in the image data that can result in an image that does not accurately reflect the scanned area. This can produce false markings in the final image or even worse can mask diseased biological tissue. These are particular concerns in the medical imaging field. For example, in optical communications systems, these concerns since the quality of data needed is set to a lower threshold that that of medical imaging. The present disclosure focuses on compensating for these imperfections through the use of the hybrids data that can include magnitude data, phase data, polarization data, and combinations thereof.

In one embodiment, the signal processing unit 90 uses hybrid data to compensate for system or component imperfections. One example in which signal processing unit 90 compensates for system or component imperfections includes compensating for non-linearities present in an optical source, e.g. a wavelength swept laser source, as described above. The non-linearity compensation may be performed in real time. Using at least the detected phase information data, numerous system and/or component imperfections and other error causing issues can be compensated for. Signal processing unit 90 can be configured to compensate for chromatic dispersion between the light from the sample S and the light from the reference R and may improve axial resolution. Signal processing unit 90 can be configured to compensate for polarization rotation, polarization mode dispersion, polarization dependent loss, and optical component wavelength dependence of an optical component (e.g. an isolator, a circulator, a splitter, a polarizer, a combiner, and combinations thereof). Signal processing unit 90 can be configured to eliminate complex conjugate ambiguity and polarization fading, which may increase overall system capability and sensitivity.

The system in accordance with the principles of the present disclosure of utilizes a receiver that includes optical and electrical components to process and analyze electro-magnetic radiation reflected from a sample S to be imaged, as well as radiation reflected from a reference R. Numerous configurations of optical and electrical components can be used. In one embodiment, sample S reflected light is sent to polarization splitter 120. Similarly, reflected light from reference reflection R is directed to polarization splitter 130, such as via coupling optics, not shown. Outputs from polarization splitters 120, 130 are sent into two sets of 90-degree optical hybrids 140, 150. The outputs of hybrids 140, 150 contain complementary signals that are sent into a set of four dual balanced photo detectors 160. Alternatively, single ended photo detectors can be used. As described above, polarization splitters 120, 130 and hybrids 140, 150 may be provided in a single housing or package, with or without photo detectors 160. The polarization splitters 120 and 130 may be connected to hybrids 140 and 150 as shown, or they may be reversed, such that the outputs of splitters 120 and 130 are connected to the photo detectors 160. The outputs of photo detectors 160 are sent into an analog-to-digital (A/D) processing unit 70. Typically, the A/D processing unit 70 samples data at a frequency between 100 MHz and 1000 MHz, and more typically at a frequency between 200 MHz and 1000 MHz. The output of A/D processing unit 70 is sent to a digital signal processing unit 90. Two-way communication exists between computer 100 and signal processing unit 90. Computer 100 typically can include a display, a user interface, a controller, memory, and networking functionality, and can communicate with one or more other components or assemblies of system 200.

The system of FIG. 3 can include a dual-polarization, dual-balanced I/Q OCT swept source receiver. A hybrid receiver can be arranged in one or more configurations. The hybrid receiver may or may not provide polarization diversity. The receiver can be configured to perform a variety of functions, including but not limited to dual balanced polarization diverse detection, dual balanced detection, e.g. use of only two of the A/D data streams, single channel Doppler processing, and double channel polarization sensitive coherence signal processing. In one embodiment, the entire optical section can be located on a single optical hybrid. In this embodiment, the electrical section including the A/D processing can be located on a single application specific integrated circuit (ASIC) or one can have discrete electrical components, e.g. a discrete A/D converter. Digital signal processing unit 90 may also be integrated, e.g. into a field programmable gate array (FPGA) or ASIC, or can consist of discrete components.

A mirror, not shown, may be used in place of sample S, such as in a temporary arrangement to perform a system calibration or diagnostic procedure, such as to identify or characterize one or more component or system imperfections. The calibration or diagnostic procedure can be performed at the time of manufacture or after installation at a clinical site, such as a calibration procedure performed on a routine basis. The mirror can also be integrated into the system, where a portion of either the first or second radiation source is coupled or tapped and directed towards the mirror. The optical path length of the first radiation source can be closely matched to the optical path length of the tapped radiation source and mirror couple to ensure proper interference at the detector/interferogram unit 220. A mechanism may also be employed to manually or automatically attenuate the reflection from the mirror. The mirror may include one or more waveplates that are used during the calibration process, simultaneously or sequentially. The set of waveplates can be used to ensure that all polarization modes are mapped out and calibrated in the receiver chain.

Figure 4:
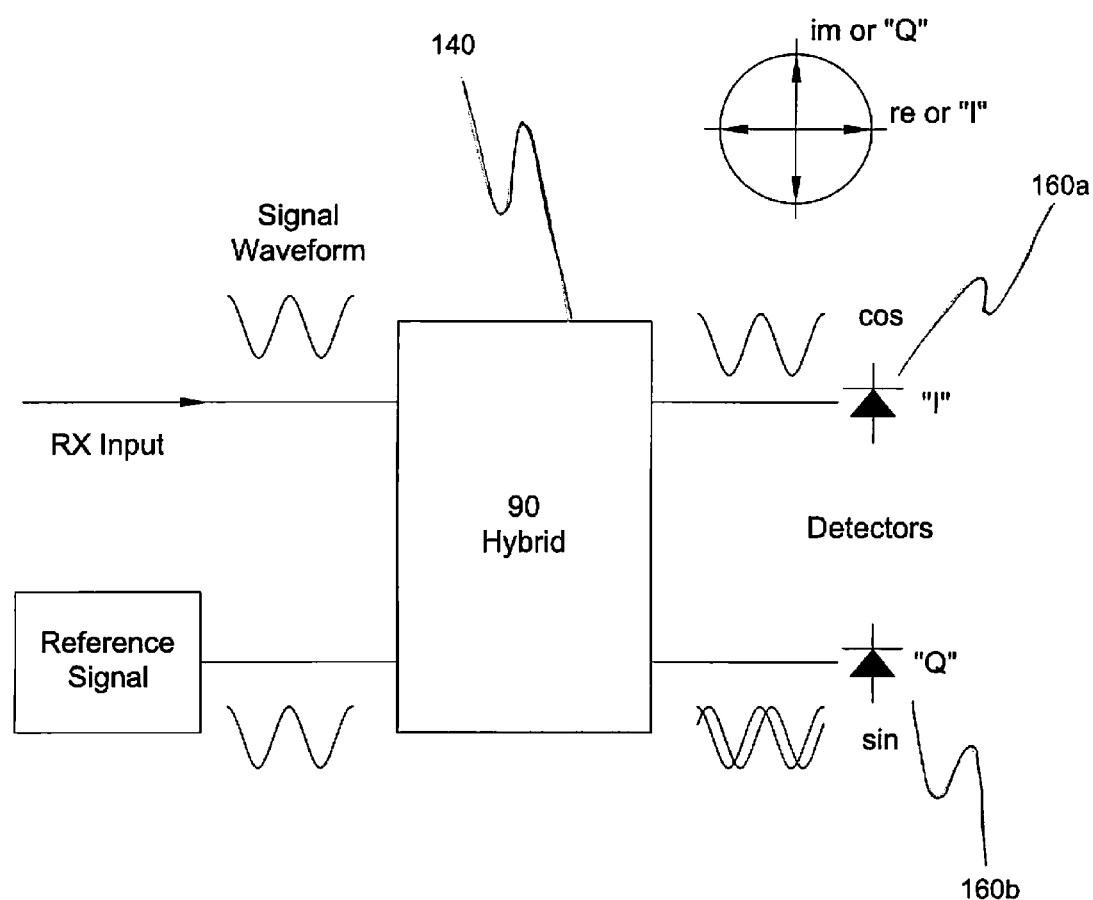
FIG. 4 is a schematic of an optical hybrid in accordance with the principles of the present disclosure.

FIG. 4 is a schematic view of one 90-degree hybrid of FIG. 3. The signal received from the sample S, shown as RX input, is routed to the output of 90-degree hybrid 140 in two channels that are out of phase by approximately 90-degrees. Similarly, a signal input on the reference signal arm is also routed to the output of 90-degree hybrid 140 in two channels that are out of phase by approximately 90-degrees. There are a variety of ways to make 90-degree hybrids, as is known in the art, but generally speaking, there are methods using bulk, fiber, integrated optics and or combinations thereof. The outputs of hybrid 140 contain signals that are sent into photo detectors 160a, 160b.

Figure 5:
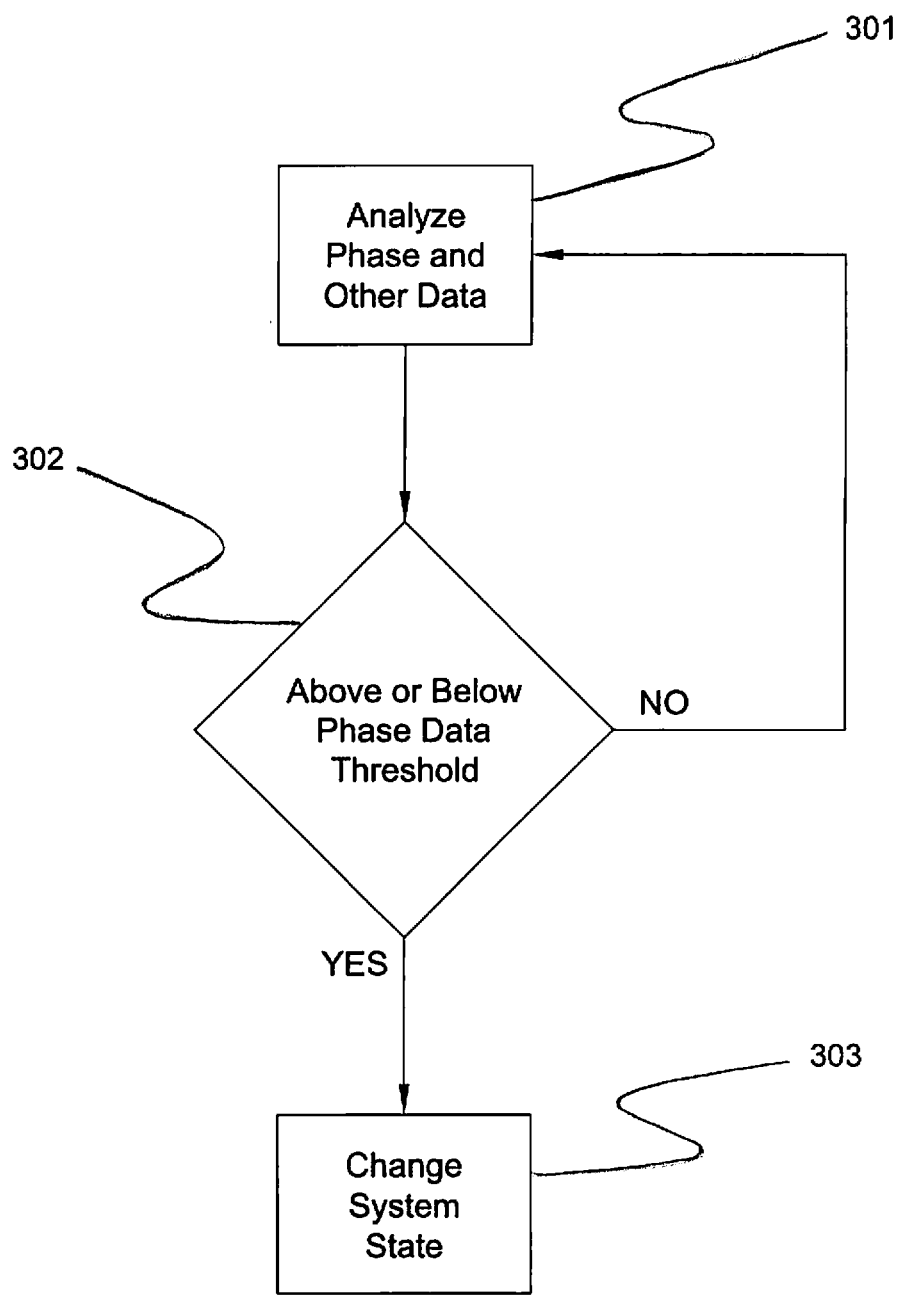
FIG. 5 is a flow chart illustrating a method for processing imaging data in accordance with the principles of the present disclosure.

FIG. 5 is a flowchart illustrating a method of processing optical image data in accordance with the principles of the present disclosure. The method is employed to detect if collected hybrid data, as described above, exceeds a predetermined threshold value, thus providing the option to proceed with the image generation or to change the system state.

In step 301, signal processing unit 90 analyzes and compares hybrid data or processed hybrid data to a threshold value. Processed hybrid data can include data that has been averaged, combined, integrated, extrapolated, mathematically processed, filtered, amplified, and combinations thereof. Non-hybrid data, processed or otherwise, may also be used by signal processing unit 90 alone or in combination with the hybrid data. In step 302, signal processing unit 90 determines if the hybrid data or processed hybrid data exceeds a threshold value or values. If the hybrid data does not exceed the threshold, the system will continue to analyze the hybrid data and other data. If the hybrid data exceeds a threshold, the process will proceed to step 303, and change the system state. Non-limiting examples of changing the system state include entering an alarm state, marking or distinguishing a portion of the sample, identifying a discovered artifact, turning off a system component, e.g. power down, and combinations thereof.

In step 301 signal processing unit 90 can also be used to improve the quality of an image based on other data, e.g. image quality data, similar to the data described above. The quality data can be qualitative or quantitative data and can provide an assessment of one or more of resolution of image, likelihood of distortion, and likelihood of presence of an artifact. In one embodiment, the quality data can be represented as an overlay layer of image 280. For example, a color scale, similar to a color scale used in a heat map, representing poor to superior quality may overlay image 280 at the option of the user.

The thresholds values can be stored in the memory of the system. Multiple thresholds can be included, such as multiple thresholds for multiple processes, or multiple thresholds for a single process. The thresholds may be adjusted based on one or more system parameters, such as when the system includes a kit of components with multiple useable components or configurations (e.g. sizes, shapes, focal lengths, depths of field, image size, etc), and the threshold is adjusted based on the actual components or configurations used. In one embodiment, one or more thresholds are adjustable by a clinician, such as via a password controlled user interface.

Figure 6:
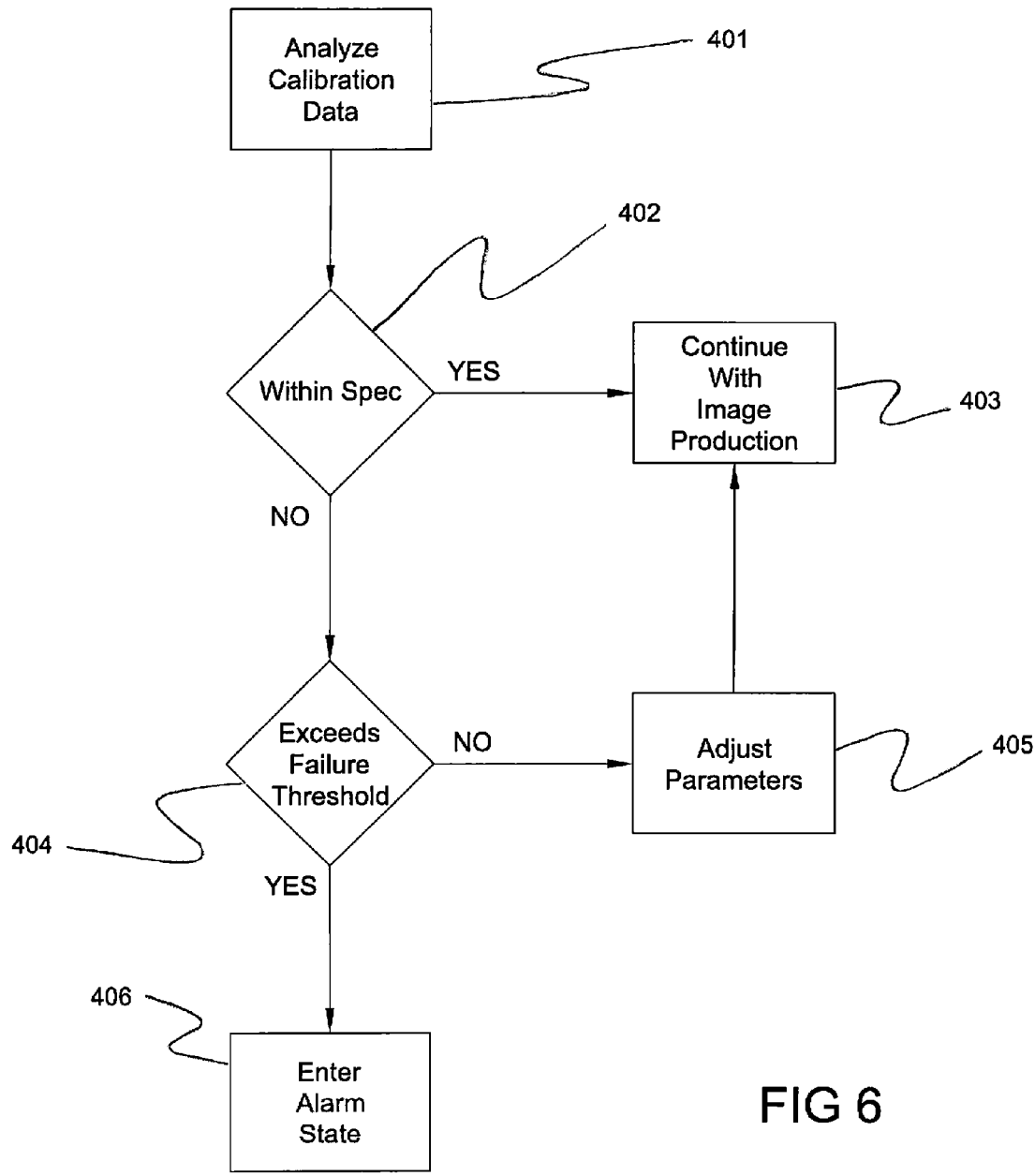
FIG. 6 is a flow chart illustrating a method for calibrating and imaging system in accordance with the principles of the present disclosure.

FIG. 6 is a flowchart illustrating a method for calibrating an imaging system in accordance with the principles of the present disclosure. The calibration method is designed to calibrate one or more system parameters based on recorded hybrid data, similar to data described above. One or more system parameters that can be calibrated include rotational velocity of a probe, translational velocity of a probe, power delivered, a filter parameter, a light splitting parameter, a polarization parameter, a phase deviation parameter, a backscattering intensity parameter, and combinations thereof. In one embodiment, the method can be performed or activated manually. Alternatively, the method can be initiated automatically, such as during a system power on or prior to acquisition of an image. In one embodiment, the method performs a comparison of hybrid data or processed hybrid data to one or more thresholds. Processed hybrid data can include data as described above. The method can be performed at various times, for example, prior to creating the image or during creation of the image. Additionally, the method may be performed repetitively for a preset number of iterations. In one embodiment, a successful completion of the calibration process can be required prior to any acquisition of the image.

In step 401, an analysis of calibration data is performed. In one embodiment, the calibration data can include hybrid data and can be compared to a threshold value. In one embodiment, the calibration data and/or hybrid data can be stored in the memory such that the system can have a collection of values with which to compare. The collected data can be compared to previously collected data, such as data collected when a test signal (such as the test signal described above) was delivered to at least a portion of the system. In step 402, if it is determined that the data is within the specification for the system, the system may continue with image production, as shown in step 403. If the data is not within the specification, the subroutine proceeds to step 404 where the subroutine assesses whether the data exceeds a threshold value or values, similar to the threshold values discussed above. If the data does not exceed the threshold value, the subroutine will proceed to step 405 and adjust the system parameters to reflect the predetermined values and continue with image production. If the data does not exceed the threshold value, in step 406 the system can enter an alarm state.

While the preferred embodiments of the devices and methods have been described in reference to the environment in which they were developed, they are merely illustrative of the principles of the inventions. Modification or combinations of the above described assemblies, other embodiments, configurations, and methods for carrying out the invention, and variations of aspects of the invention that are obvious to those of skill in the art are intended to be within the scope of the claims. In addition, where this application has listed the steps of a method or procedure in a specific order, it may be possible, or even expedient in certain circumstances, to change the order in which some steps are performed, and it is intended that the particular steps of the method or procedure claim set forth here below not be construed as being order-specific unless such order specificity is expressly stated in the claims. Therefore, the above description should not be construed as limiting, but merely as exemplification of the various embodiments. Those skilled in the art will envision other modifications within the scope and spirit of the claims appended hereto.

What is claimed is:

1. An imaging system, comprising:
    an electro-magnetic radiation source configured to provide a first electro-magnetic radiation to a sample and a second electro-magnetic radiation to a reference, wherein a frequency of radiation provided by the electro-magnetic radiation source varies over time;
    a detector/interferogram unit configured to detect an interference between a third radiation associated with the first radiation and a fourth radiation associated with the second radiation and generate at least one interferogram associated with the third electro-magnetic radiation and the fourth electro-magnetic radiation; and
    a signal processing unit configured to extract hybrid data from the at least one interferogram and produce an image of the sample based on the hybrid data,
    wherein the hybrid data includes at least one of magnitude data, phase data, and polarization data,
    wherein said signal processing unit is further configured to improve the quality of the image based on the hybrid data by adjusting one or more variables used to produce the image,
    wherein the quality of the image is improved by at least one of reducing artifacts, eliminating the complex conjugate ambiguity, reducing polarization fading, increasing system sensitivity, improving axial resolution, and compensating for at least one of system imperfections, detector/interferogram unit imperfections, non-linearities present in the electro-magnetic radiation source, chromatic dispersion, polarization rotation, compensating for polarization dependent loss, polarization mode dispersion, wavelength dependence of at least one optical component of the system, electro-magnetic radiation source nonlinearities, imperfections in a polarization splitting ratio, imperfections in wavelength-dependent polarization mode dispersion, imperfections in wavelength-dependent polarization dependent loss, imperfections in wavelength-dependent phase deviations, and imperfections in polarization-dependent phase deviation, wherein the compensating for non-linearities present in the electro-magnetic radiation source is performed in real time.

2. The system of claim 1, wherein the detector/interferogram unit includes a polarization diverse, dual balanced, optical in-phase/quadrature receiver.

3. The system of claim 1, wherein the compensating for chromatic dispersion is performed between a sample arm and a reference arm.

4. The system of claim 1, wherein the optical component is at least one of an isolator, a circulator, a splitter, and a polarizer.

5. The system of claim 1, further comprising:
a test signal generator configured to generate a test signal including a fifth electro-magnetic radiation provided to the electro-magnetic radiation source; and
a memory for storing data,
wherein the system detects test signal data and stores said test signal data in the memory.

6. The system of claim 5, wherein the fifth electro-magnetic radiation is generated from the first electro-magnetic radiation.

7. The system of claim 5, wherein the signal processing unit is configured to produce the image of the sample based on at least a portion of the test signal data stored in the memory.

8. The system of claim 1, further comprising at least one continuously rotating optical imaging system configured to receive at least one signal that is associated with a component of the system.

9. The system of claim 8, wherein the signal processing unit is further configured to determine the rotational velocity of the optical imaging system based on the hybrid data.

10. The system of claim 9, wherein the signal processing unit is further configured to compensate for rotational speed variations of the optical imaging system.

11. The system of claim 1, wherein the signal processing unit is further configured to compare hybrid data or processed hybrid data to a threshold.

12. The system of claim 11, wherein the signal processing unit is configured, if the threshold is exceeded, to produce at least one of an alarm state, associate at least a portion of an image to an alert state, associate at least a portion of an image as including at least one artifact, disable at least one system component, turns off power to a tissue marking device, modifies energy delivered by a tissue marking device to tissue, turns off power to a therapeutic element, modifies energy delivered by a therapeutic element to tissue, and modifies delivery of a drug or other agent by a therapeutic element.

13. The system of claim 1, wherein the signal processing unit is further configured to perform a system calibration.

14. The system of claim 13, wherein to perform the calibration the signal processing unit is further configured to set the value of the one or more system parameters based on the hybrid data.

15. The system of claim 13, further comprising a mirror configured to receive the first electro-magnetic radiation from the electro-magnetic radiation source, wherein the signal processing unit is configured to increase the quality of the image based on signals received from the mirror.

16. The system of claim 15, wherein the signal processing unit is configured to diagnose component and/or system imperfections based on signals received from the mirror.

17. The system of claim 13, wherein the system parameter is at least one of rotational velocity of a probe, translational velocity of a probe, power delivered, a filter parameter, a light splitting parameter, a polarization parameter, a phase deviation parameter, and a backscattering intensity parameter.

18. The system of claim 1, further comprising an analog to digital converter.

19. The system of claim 18, wherein the analog to digital converter samples data at a frequency between 100 MHz and 1000 MHz.

20. The system of claim 18, wherein the analog to digital converter samples data at a frequency between 200 MHz and 1000 MHz.

21. The system of claim 1 further comprising a display for displaying the image.

22. The system of claim 1, wherein the electro-magnetic radiation source comprises at least one of a laser, a varied frequency laser, and a swept frequency laser.

23. The system of claim 1, wherein the electro-magnetic radiation source comprises an interferometer.

24. The system of claim 1, wherein the detector/interferogram unit comprises:
two polarization splitters; and
two 90-degree optical hybrids.

25. The system of claim 24, wherein the two polarization splitters and the two 90-degree optical hybrids are provided in a single package.

26. The system of claim 25, wherein the single package includes a pair of optical paths with matching lengths.

27. The system of claim 25, wherein the single package further includes photo detectors.

28. The system of claim 1, wherein the detector/interferogram unit comprises at least one optical hybrid to provide in-phase and quadrature interferogram signals.

29. The system of claim 1 wherein the detector/interferogram unit comprises at least two polarization splitters to enable separation and measurement of a polarization state.

30. The system of claim 1, wherein the image includes movement information represented by variations in one or more of color, shade, hue, pixel density, brightness, and contrast.

31. The system of claim 1, wherein the image is one of a two dimensional image and a three dimensional image.

32. The system of claim 1, further comprising image quality data representing a quality assessment of at least a portion of the image,
wherein the quality data is based on the hybrid data associated with the at least the portion of the sample image, and
wherein the image quality data provides an assessment of one or more of resolution of image, likelihood of distortion, and likelihood of presence of an artifact.

33. A method for processing image data in an imaging system, comprising the steps of:
providing by an electro-magnetic radiation source a first electro-magnetic radiation to a sample and a second electro-magnetic radiation to a reference;
varying a frequency of radiation provided by the electro-magnetic radiation source varies over time;
detecting by a detector/interferogram unit an interference between a third radiation associated with the first radiation and a fourth radiation associated with the second radiation; generating by the detector/interferogram unit at least one interferogram associated with the third electro-magnetic radiation and the fourth electro-magnetic radiation;

extracting by a signal processing unit hybrid data from the at least one interferogram; and producing by the signal processing unit an image of the sample based on the hybrid data, further comprising comparing by the signal processing unit hybrid data or processed hybrid data to a threshold, wherein the hybrid data includes at least one of magnitude data, phase data, and polarization data;

wherein if the threshold is exceeded the method further comprises at least one of producing an alarm state, associating at least a portion of an image to an alert state, associating at least a portion of an image as including at least one artifact, disabling at least one system component, turning off power to a tissue marking device, modifying energy delivered by a tissue marking device to tissue, turning off power to a therapeutic element, modifying energy delivered by a therapeutic element to tissue, and modifying delivery of a drug or other agent by a therapeutic element.

34. The system of claim 33, further comprising improving by the signal processing unit the quality of the image based on the hybrid data by adjusting one or more variables used to produce the image.

35. The system of claim 34, wherein the quality of the image is improved by at least one of reducing artifacts, eliminating the complex conjugate ambiguity, reducing polarization fading, increasing system sensitivity, improving axial resolution, and compensating for at least one of system imperfections, detector/interferogram unit imperfections, non-linearities present in the electro-magnetic radiation source, chromatic dispersion, polarization rotation, compensating for polarization dependent loss, polarization mode dispersion, wavelength dependence of at least one optical component of the system, electro-magnetic radiation source nonlinearities, imperfections in a polarization splitting ratio, imperfections in wavelength-dependent polarization mode dispersion, imperfections in wavelength-dependent polarization dependent loss, imperfections in wavelength-dependent phase deviations, and imperfections in polarization-dependent phase deviation.

* * * * *